H. PEDERSEN.
PROCESS ENABLING ALUMINA TO BE OBTAINED FROM CLAY AND OTHER IMPURE ALUMINOUS MATERIALS.
APPLICATION FILED JUNE 30, 1920.
1,406,890. Patented Feb. 14, 1922.
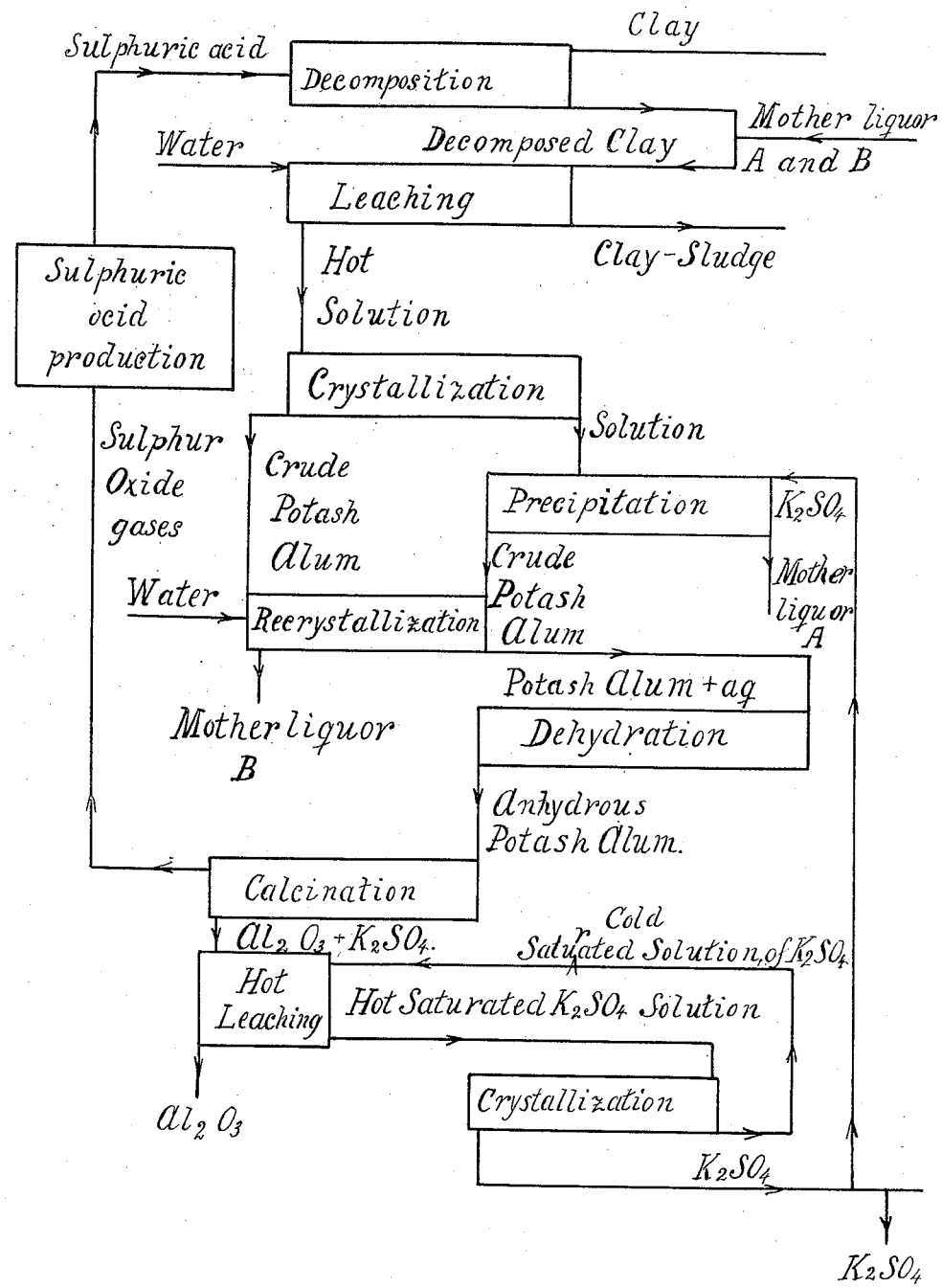

though sparingly.

UNITED STATES PATENT OFFICE.

HARALD PEDERSEN, OF TRONDHJEM, NORWAY, ASSIGNOR TO A/S HÖYANGFALDENE NORSK ALUMINIUM CO., OF CHRISTIANIA, NORWAY.

PROCESS ENABLING ALUMINA TO BE OBTAINED FROM CLAY AND OTHER IMPURE ALUMINOUS MATERIALS.

1,406,890.

Specification of Letters Patent. Patented Feb. 14, 1922.

Application filed June 30, 1920. Serial No. 393,200.

*To all whom it may concern:*

Be it known that I, HARALD PEDERSEN, a subject of the King of Norway, residing at Trondhjem, in the Kingdom of Norway, have invented certain new and useful Improvements in a Process Enabling Alumina to be Obtained from Clay and other Impure Aluminous Materials, (for which I have filed applications in Norway Nov. 12, 1917, February 14, 1918, and October 14, 1918;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the manufacture of alumina and has for its object a process enabling alumina to be obtained from clay and other impure aluminous materials of a similar nature.

As known the use of clay as a raw-material in the aluminium industry is subject to certain difficulties of a technical nature which compel the manufacture of aluminium to still be substantially based upon the use of other aluminous materials, which occur in nature only at a rather limited number of places.

By the present process for the manufacture of alumina it is made possible to use ordinary clay as a raw-material in the aluminium industry whereby only easily accessible materials need be used in the process.

An important object of the invention consists in establishing a process in which the various chemical, thermic and technical operations constituting the same are of a simple nature, so that the execution of the process is not dependent upon the use of skilled workers.

Another important object of the invention consists in avoiding the necessity of evaporation processes. Thus not only a saving in combustibles is attained but at the same time this involves the avoidance of technical difficulties in connection with the apparatuses which might arise as a consequence of the corroding action of the treated liquids upon metals.

Notwithstanding the comparatively low percentage of alumina in clay as compared with other materials the process reduces the comsumption of combustibles down to a quantity corresponding to that employed in the manufacture of alumina from the usual raw materials which contain nearly four times as much alumina.

The present process may be characterized as based upon the utilization of the potassium content of the clay to form potassium alum in such a manner as to allow of using a substantial quantity of the resulting potassium sulphate in the process as a means to produce alum. As compared with the known ammonia process for the production of alumina, the present process has the great advantage of permitting a circulation of the potassium sulphate in the process, which is not possible with the ammonia and besides this the ammonia process when used for the formation of alum requires evaporation.

The present process in its broad features comprises three principal stages. In the first stage of the process the clay is decomposed by means of sulphuric acid so as to obtain a mixture of sulphates and free silica. This mixture is separated by a filtration process whereby a solution of potash alum and a practically valueless sludge containing iron compounds and silica is obtained.

The next principal stage of the process consists in the precipitation of potash alum whereby potash alum practically free from iron is obtained.

In the third and last stage of the process this potash alum is decomposed to form alumina, sulphur oxide gases and potassium sulphate, the last-named substance being then recovered in order to be used in the second stage of the process for the precipitation of alum, the excess quantity constituting a valuable by-product of the process.

In the following a preferred method of carrying the invention into effect is described by way of example.

In the following example it is presumed that the treated clay contains about 16 per cent alumina, about 8 per cent of ferrous oxide, about 3 per cent of potassium oxide and about 56 per cent silica besides some other constituents which do not influence the execution of the process.

The clay is first dried in the air and ground, whereupon it is mixed with chamber acid (an acid of a corresponding higher concentration being employed when moist clay is treated). It has been found to be of advantage to use an excess quantity of clay in relation to the acid, it being by this means possible to dissolve a greater quantity of alumina than when equimolecular proportions are used. The mixing with acid can be effected in any known manner for instance in bins, or by means of drums or mechanical stirrers. Considerable quantities of heat are evolved so that the temperature in the resulting mixture is raised to about 140° C. It is of importance to use the clay in an air-dried and not in a calcined condition, because when air dried clay is used the sulphate produced by the action of the sulphuric acid upon the ferrous oxide is not alum-forming. The resulting iron sulphate can therefore be filtered off and does not accompany the alum. By the reaction the silicates are decomposed in the known manner under formation of corresponding sulphates and free silica. The reaction is brought about in two steps, an after reaction being caused to take place in a period of about 24 hours after the main reaction, the formation of the sulphates being hereby completed. The mass hardens to hard lumps.

The next step in the decomposition process consists in a heating of the reaction mass to about 200° C., whereby the silica is converted into an easily filterable condition. At the same time traces of sulphuric acid which might still be present will be converted into sulphates so that every trace of free sulphuric acid is eliminated, this being of considerable importance for the subsequent filtering operation.

The execution of this heating process can take place in an open revoluble drum with a slight inclination from the charging place towards the opposite end, where the drum is connected with a furnace or with a conduit for hot gases.

The mass is now in a condition to allow of filtration after dissolution. The dissolution is effected in hot water while stirring the mass, so much water being used that the filtered solution obtains a specific gravity of about 1.3 to 1.4 (about 35° Bé.). The liquid then contains about 80-90 g. of alumina in the litre. The sludge discharged from the filter mass is washed and thrown away.

The wash-water is used to dissolve further quantities of reaction mass.

The solution which is obtained by the described treatment and which is still hot, is cooled down to ordinary temperature, whereby potash alum is crystallized out in a quantity corresponding to the quantity of potash which has been dissolved from the clay (about 200-250 kg. of potash alum to each 1000 kg. of clay). The crystallized alum is filtered off in a vacuum filter. By this crystallization operation about one fourth of the alum content of the solution is crystallized out. The crystallization is effected while cooling and agitating the liquid.

Powdered sulphate of potassium (obtained in a later stage of the process) is now introduced into the liquid in a cold condition and under agitation. In the course of a couple of hours a quantity of alum corresponding to the added potassium salt is hereby precipitated and this alum is filtered off in a vacuum filter.

The mother liquor containing iron sulphate and some alum may be used in the process in some way or another (for instance in the stage of decomposing the clay) but it may also be utilized independently.

The alum obtained by the two crystallization processes still contains a few percent of sulphate of iron which must be removed. To this end the crude alum is dissolved in the smallest possible quantity of water whereupon it is again caused to crystallize while cooling and stirring the liquid. The recrystallized alum, which now contains less than 0.01 per cent of iron is filtered off in a vacuum filter and the remaining liquid is returned to the vessel in which the dissolution of the reaction mass takes place.

The third principal stage of the process is now to be proceeded with, the alum having to be decomposed in the most economical manner. Before this decomposition is effected it has been found to be necessary from a technical point of view to deprive the alum of its water of crystallization, because a direct decomposition of the water-bearing alum involves great difficulties of different nature in connection with the apparatuses and more especially consisting therein, that the water-bearing alum forms a tough hard mass which coalesces and sticks to all apparatus parts. To expel the water of crystallization from the alum this latter is introduced into a furnace (preferably a revolving tube furnace) at the point of the highest temperature, that is at the end where the combustion takes place. The sudden sharp heating effects a bursting of the crystals and their liability to coalesce is completely eliminated.

The decomposition is effected by heating the dehydrated alum to 700-800° C. which may also take place in a revolving tube furnace. Hereby the sulphuric acid combined with the alumina is expelled in the form of sulphur oxides, the potassium sulphate, however, remaining unchanged. The resulting sulphur oxide gases are worked up to sulphuric acid by known means and the sulphuric acid so obtained is used in the first stage of the process.

The decomposed alum so obtained is now heated to about 100° C. with cold-saturated potassium sulphate solution. This potassium sulphate solution when heated dissolves the potassium sulphate which is present in the decomposed alum and the alumina can now be filtered off in a filter press. The hot-saturated potassium sulphate solution is thereupon cooled, so that potassium sulphate is crystallized out. This salt is filtered off on a vacuum filter and the solution is again used in the process in the described manner.

As above mentioned the greater part of the so obtained potassium sulphate is again used in the process for the cold precipitation of alum in the second stage of the process while the rest leaves the system and forms a valuable byproduct.

The course of the process as above described is diagrammatically illustrated in the accompanying drawing.

Claims:

1. Process of preparing alumina comprising in combination the steps of reacting upon a potassium bearing clay with sulphuric acid, lixiviating the product, adding potassium sulphate to the obtained solution to produce potassium alum, decomposing the potassium alum by heating, separating the resulting potassium sulphate from the alumina by lixiviation, recovering potassium sulphate from the solution and adding a portion of the potassium sulphate to the sulphate solution obtained from a further portion of potassium bearing clay.

2. Process for the preparation of alumina according to claim 1 in which the clay is reacted upon with sulphuric acid in a quantity which is insufficient to convert the entire content of metal compounds in the material into sulphates.

3. Process for the preparation of alumina according to claim 1 comprising the steps of reacting upon the clay with sulphuric acid in a, quantity which is insufficient to convert the entire content of metal compounds in the material into sulphates and after a comparatively long after-reaction period subjecting the reaction mixture to heating sufficient to chemically bind such quantities of free reagent which might be still present in the mixture and to convert the silica into an easily filtrating form.

4. Process of producing alumina according to claim 1 in which the potassium alum is subjected to a sudden sharp heating operation to expel the water of crystallization and then heating the dehydrated alum to a temperature sufficient to effect the decomposition of the alum into alumina and sulphur oxides, the decomposition product being thereupon subjected to lixiviation to separate the potassium sulphate from alumina.

5. Process for the preparation of alumina according to claim 1 comprising in combination the steps of subjecting the produced potassium alum to a sudden sharp heating operation to expel the water of crystallization and then heating the dehydrated alum to a temperature sufficient to effect the decomposition of the alum into alumina and sulphur oxides, the alum being maintained in motion during the heating operations, the decomposition product being thereupon subjected to lixiviation to separate potassium sulphate from the alumina.

6. Process of preparing alumina according to claim 1, comprising in combination the steps of producing potassium alum from potassium bearing clay, decomposing the potassium alum by heat, lixiviating the decomposition product at a raised temperature with a cold-saturated potassium sulphate solution, separating the resulting hot solution from the solids and cooling the solution to effect the crystallization of potassium sulphate therefrom.

7. Process of preparing alumina according to claim 1 comprising in combination the steps of producing potassium alum from potassium bearing clay, decomposing the alum by heat, lixiviating the decomposition product at a raised temperature with a cold saturated potassium sulphate solution, separating the resulting hot solution from the solids and cooling the solution to effect the crystallization of potassium sulphate therefrom, a further quantity of decomposed alum being thereupon lixiviated at a raised temperature with the resulting mother liquor.

In testimony that I claim the foregoing as my invention, I have signed my name in presence of two subscribing witnesses.

HARALD PEDERSEN.

Witnesses:
　HAAHAN KVENILD,
　FRANCES R. JEWETT.